United States Patent [19]

Teske et al.

[11] 4,069,928
[45] Jan. 24, 1978

[54] MACHINE FOR CLEARING BULK MATERIAL

[76] Inventors: Fritz Teske, Industriestr. 28; Lothar Teske, Industriester. 30, both of 505 Porz, Germany

[21] Appl. No.: 601,425

[22] Filed: Aug. 4, 1975

[30] Foreign Application Priority Data

Aug. 14, 1974 United Kingdom ............... 35876/74

[51] Int. Cl.² ...................... B65G 65/42; B65G 65/46
[52] U.S. Cl. .................................. 214/17 DC; 173/8; 198/507; 198/518; 198/598; 222/63
[58] Field of Search ......... 214/17 D, 17 DC, 17 DA; 198/9, 36, 507, 518, 572, 598; 222/63, 236; 37/67, 86, 94, DIG. 1; 173/8, 9; 299/1

[56] References Cited

U.S. PATENT DOCUMENTS

| 3,237,788 | 3/1966 | Weaver et al. | 214/17 DA |
| 3,380,179 | 4/1968 | Schmidt | 37/67 |
| 3,539,058 | 11/1970 | Ferris | 214/17 DA |
| 3,944,086 | 3/1976 | Frisz et al. | 214/17 DA |

FOREIGN PATENT DOCUMENTS

1,262,902  3/1968  Germany ..................... 214/17 DC

Primary Examiner—Trygve M. Blix
Assistant Examiner—Charles E. Frankfort
Attorney, Agent, or Firm—Diller, Brown, Ramik & Wight

[57] ABSTRACT

This disclosure relates to a machine for clearing bulk material from a bin table by moving therealong a movable support carrying a pivotally mounted rotatable clearing wheel including a first drive mechanism for moving the movable support and a second drive mechanism for rotating the clearing wheel and a control mechanism responsive to operational conditions of the second drive mechanism for controlling the operation of the first drive mechanism whereby the rotational speed of the clearing wheel may be increased or decreased as might be the speed of the movable support in dependence upon the resistance of the bulk material being offered to the clearing wheel during the rotation of the latter.

7 Claims, 5 Drawing Figures

MACHINE FOR CLEARING BULK MATERIAL

This invention relates to a novel machine for clearing or removing bulk material from at least one bin table onto a conveyor by means of a bin-emptying car which pivotally carries a rotatable clearing wheel with the bin-emptying car being designed to travel along the bin table.

In conventional bin-emptying cars there is provided a clearing unit upon which the clearing wheel is pivotally mounted, and the clearing unit is in turn slidably mounted upon a shuttle car. In bin-emptying cars of this type the drive systems for the clearing wheel and the shuttle car are arranged in such a way that respective electric drive motors thereof act through mechanical transmission elements as, for example, gears, pinions, shafts, etc. In view of this type of electromechanical drive it is extremely difficult to control both the rotational speed of the clearing wheel and also the rate of advance of the shuttle car dependent upon the conditions prevailing during the discharge of bulk material from a bin table. Since the conditions of the bulk material continuously change it is difficult to control the electric motors in corresponding response to the conditions of the material, and this can only be obtained by means of complicated and expensive electrical control systems, particularly since the pivoting of the clearing unit varies the depth of penetration of the clearing wheel into the bulk material which is to be discharged. In such known systems jamming of the clearing wheel in the material and other damage to the drive system cannot be avoided with any degree of reliability. In particular, it is difficult while the bin-emptying car is in motion to take into account local difficulties in and obstacles to the clearing operation for either changing the output of the drive system for the clearing wheel or changing the output of the drive system for the movement of the bin-emptying car, or both.

In accordance with the present invention it is a primary object thereof to provide a control system for a bin-emptying car carrying a pivotal clearing unit which guarantees fully automatic operation of the machine while taking into account the rapidly changing power requirements both for the rotating clearing wheel and for the bin-emptying car itself thus insuring that all power requirements of the latter two components are utilized to full effect. The conventional bin-emptying car of the type just described is distinguished by the present invention through a drive system for both the rotatable clearing wheel and the shuttle car which is of a hydraulic type forming portions of a hydraulic circuit such that both drives are controlled by hydraulic pressure within a portion of the hydraulic circuit driving the hydraulic drive of the clearing wheel.

In accordance with this invention the particular pressure within the hydraulic circuit required for each hydraulic drive system represents the means by which the output of the hydraulic drive systems are adjusted in dependence upon the difficulty or ease of the clearing operation i.e., dependent upon the resistance which the material to be discharged offers to the rotatable clearing wheel.

Through the use novely arranged safety valves, pressure valves, etc., the hydraulic drive systems are readily prevented from being overloaded and both maximum and minimum pressure within the hydraulic circuit can be detected to either preclude operation or prevent operation, as the case may be.

In further keeping with this invention the rotatable clearing wheel is carried by a pivotally mounted arm having a free end which moves along a track of the clearing unit and carries a predetermined number of position switches. Each switch represents a predetermined rotational speed of the clearing wheel and a predetermined speed of travel of the shuttle car with the relationship being such that the rotational speed of the clearing wheel becomes slower the more deeply it penetrates into the material to be cleared and with any increase or decrease of the speed of the clearing wheel the motion of the shuttle car is respectively increased and decreased. Preferably the rate of travel of the shuttle car is not any greater than the peripheral speed of the clearing wheel in any particular clearing position because otherwise the bulk material being cleared or discharged is compressed and hence tends to agglomerate, and the latter is precluded by the correspondence between the pivoting speed and rotational speed of the clearing wheel and the advancement speed of the shuttle car.

In further accordance with this invention the hydraulic circuit or system includes pressure switches and pressure valves in such a manner that the machine will be inoperative if pressure within the hydraulic system is too low, the machine operation will be termined if pressure within the system exceeds a predetermined pressure, and that another pressure in the direction of motion of the shuttle car will be temporarily reversed to reduce overload or extremely high resistance offered to the clearing wheel during a clearing operation.

As to the more specific construction of the hydraulic circuit, one of the pressure switches for detecting maximum pressure of the system may be designed for a pressure of, for example, 300 atmospheres gauge which is transmitted to a hydraulic motor of the clearing wheel for a predetermined period, for example of about 5 seconds, which is governed by a timing relay. During this time a bin-emptying car may be started and normal operations can be carried out. However, at a pressure beyond the desired maximum pressure the machine simply will not start.

Another pressure switch within the hydraulic circuit monitors so-called minipressure which is empirically adjusted for each installation of the machine. This pressure may vary between 40 and 70 atmospheres gauge, and the purpose thereof is to monitor the layer height of the bulk material. One purpose performed by the minipressure sensing pressure switch is to reverse the direction of travel of the shuttle car before the clearing wheel is removed from the bulk material to avoid any interruptions during discharge of the bulk material by, for example, temporarily backing-off the shuttle car when resistance to clearing by the clearing wheel is too high and after a short dwell period permitting the shuttle car to again assume its initial direction of movement.

A third pressure switch is used specifically and directly for reversing the direction of travel of the bin-emptying car. When a predetermined hydraulic pressure is reached in the hydraulic portion which drives the clearing wheel the direction of travel of the emptying car is reversed in the manner heretofore described with respect to the mini-pressure detecting switch. At a pressure of about 140 atmospheres gauge the bin-emptying car stops and reverses its direction of travel under the control of a timing relay. The distance which the bin-emptying car travels backward may correspond, for example, to half the diameter of the clearing wheel. Thereafter the direction of travel of the emptying car is reversed again and the clearing wheel again attempts to remove the material but at a different clearing angle, and again if the resistance offered to it is still so great as to exceed a predetermined hydraulic pressure the reversal of the bin-emptying car is repeated through the operation of the hydraulic pressure switch until the material can be cleared and discharged.

With the above and other objects in view that will hereinafter appear, the nature of the invention will be more clearly understood by reference to the following detailed description, the appended claimed subject matter, and the several views illustrated in the accompanying drawings.

Figure 1:
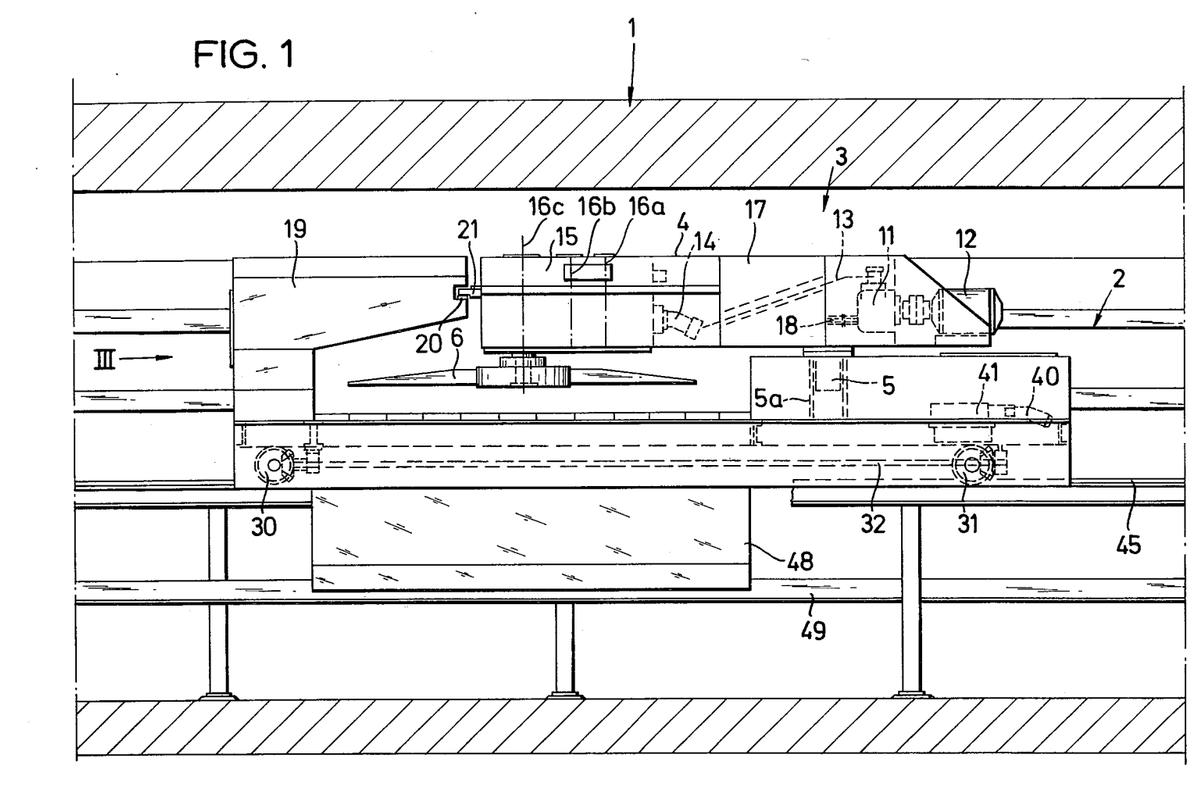
FIG. 1 is a diagrammatic side elevation view of a novel machine constructed in accordance with this invention, and illustrates a reciprocal bin-emptying car carrying a pivotally mounted clearing unit which in turn carries a rotatable clearing wheel.
Figure 2:
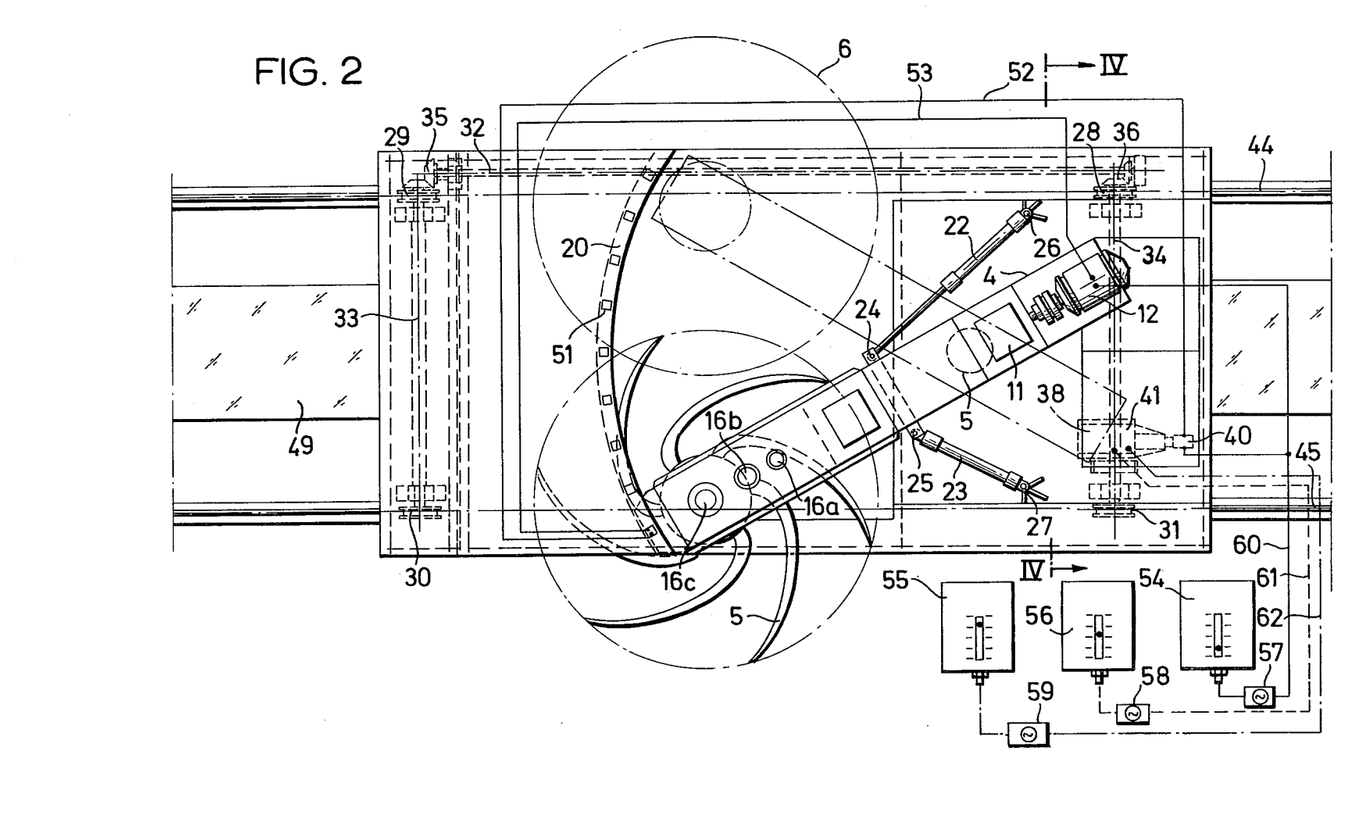
FIG. 2 is a plan view of the novel machine of this invention, and illustrates details of an arm carrying the clearing wheel and switches associated with a free terminal end of the arm.
Figure 5:
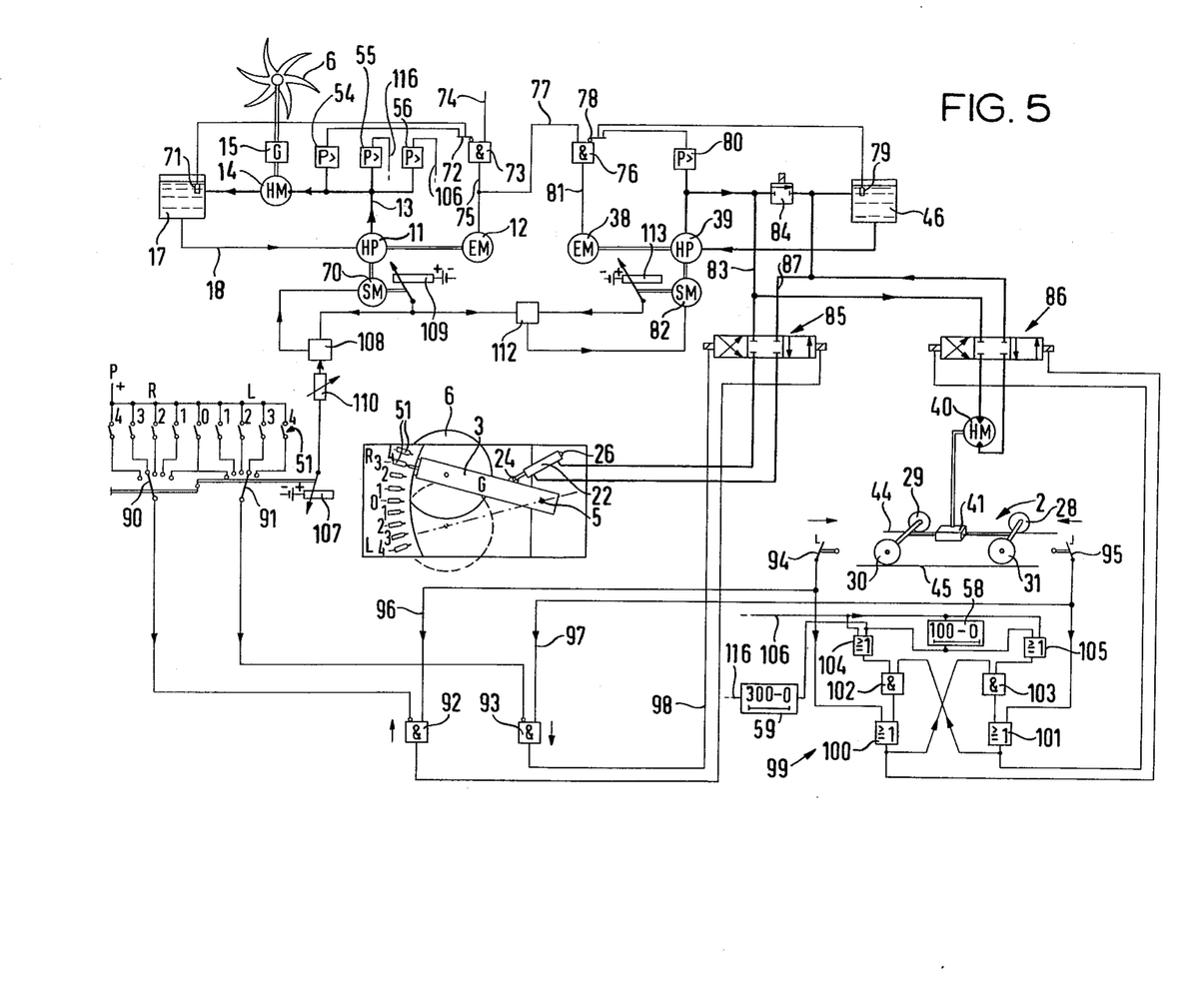
FIG. 5 illustrates hydraulic and electric circuits for operating the clearing wheel, the pivotally mounted arm carrying the same, and the drive for reciprocating the bin-emptying car.

A novel machine constructed in accordance with this invention for clearing bulk material is generally designated by the reference numeral 1 (FIG. 1) and includes a bin-emptying or shuttle car 2 carrying there atop a clearing unit 4 in the form of an arm 3 carrying at one end a pivot pin 5 journaled for rotation in a bore 5a of the car 2. The axis of the pivot 5 is vertical and permits the arm 3 to be pivoted thereabout generally in the manner indicated in solid and phantom outline in FIG. 2. At an end of the arm 3 remote from the pivot 5 there is rotatably journaled a clearing wheel 6 designed to sweep along opposite bin tables 7 (FIG. 3) of a tunnel-like housing 8 through slot-like openings 9. Bulk material lying on the tables 7, 7 at a slope governed by an apron 10 is discharged inwardly through the slot-like openings 9 during the rotation of the clearing wheel 6 by appropriate drive means including an axial piston pump 11 driven by an electric motor 12 (FIGS. 1, 2 and 5). A pressure line 13 (FIG. 5) leads from the pump 11 to a hydraulic axial piston motor 14 which drives a gear transmission 15 (FIGS. 1 and 5) connected to the clearing wheel 6 for rotating the latter. Various shafts of the gear transmission 15 are designated by reference numerals 16a through 16c (FIG. 1), and a reservoir 17 (FIGS. 1 and 5) communicate with the piston pump 11 through a line 18.

The car 2 includes a forward end extension 19 (FIG. 1) which carries an arcuate slide track 20 (FIGS. 1 and 2) upon which the arm 3 is supported by means of a bracket 21 carried thereby. The arm 3 pivots back and forth generally between a position shown in FIG. 2 by means of a piston-cylinder assembly 22 (FIGS. 2 and 5) which at its rod end is connected by a pivot pin 24 to the arm 3 and at its cylinder end is pivotally mounted on a fixed support 26.

Figure 4:
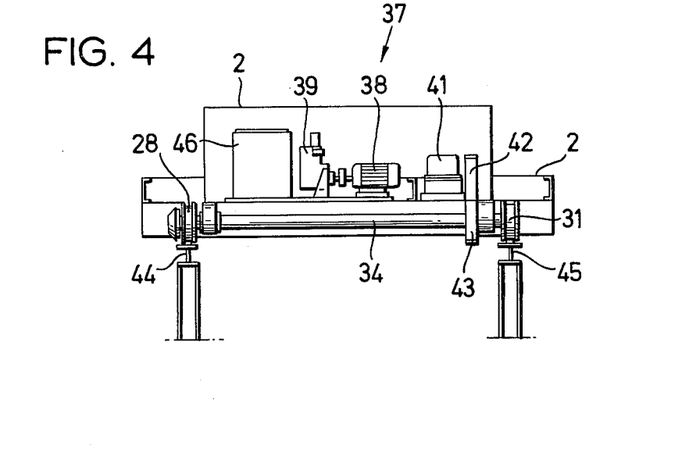
FIG. 4 is a diagrammatic sectional view taken generally along line IV—IV of FIG. 2, and illustrates a drive mechanism for imparting motion to the bin-emptying car.

The bin-emptying car 2 includes four wheels 28, 29, 30 and 31 fixed to associated shafts 33, 34 (FIG. 2) with the latter being journaled to the underside of the bin-emptying car 2 by conventional means. A shaft 32 (FIG. 2) generally spans the distance between the shafts 33, 34, and pairs of bevel gears 35, 36 place the shafts 32, 33 and 34, 32, respectively, in meshing relationship with each other. Drive means for imparting motion to the bin-emptying car 2 includes a hydraulic drive 37 (FIG. 4) which includes an electric motor 38 driving a hydraulic pump 39 which is in turn connected to a hydraulic motor 40 which in turn drives a worm gear 41. The worm gear 41 is in mesh with a gear wheel 42 in turn meshing with a gear wheel 43 keyed to the shaft 34 carrying the wheels 28, 31 (FIG. 2). The wheels 28, 29 ride on rails 44 (FIG. 4) whereas the wheels 30, 31 ride on rails 45. A reservoir 46 for the pressure medium of the hydraulic pump 39 is also carried by the car 2 the hydraulic pumps are adjustable in terms of oil output and by varying the same it is possible to vary the rotational speed of the associated gears and thus the rotational speed of the car wheels 28 through 31 and the clearing wheel 6.

Figure 3:
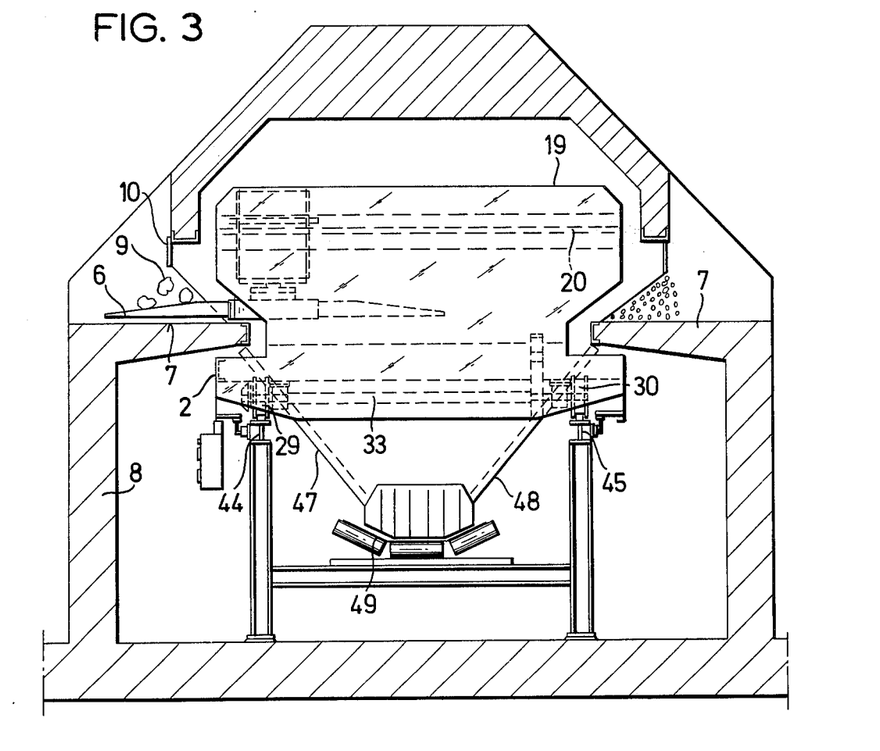
FIG. 3 is a front elevational view taken in the direction of the arrow III of FIG. 1, and illustrates a conveyor beneath the bin-emptying car upon which material is discharged by the clearing wheel from opposite bin tables.

As is best shown in FIG. 3, the car is equipped with chutes 47, 48 which carry cleared material to a conveyor belt 49 conventionally supported beneath the car and between the rails 44, 45.

Reference is now made to FIGS. 2 and 5 which illustrate the track 20 being provided at predetermined intervals with position switches 51. The position switches 51 through the hydraulic circuit and the electric circuit (FIG. 5) to be described more fully hereinafter vary the rotational speed of the clearing wheel 6 such that its speed is slowest when it projects deepest across the bin tables 7, 7 and lessens as the projection across the bin tables 7, 7 or into the openings 9 decreases. This permits the same quantity of bulk material to be cleared or discharged irrespective of the position of the clearing wheel 7 toward or away from the bin tables 7. Furthermore, as will be noted with more specifics hereinafter, the increase in the rotational speed of the clearing wheel 6 is accompanied by an increase in the speed of the car drive mechanism 37 which is also influenced by the position switches 51 to increase the rate of travel of the bin-emptying car 2 accordingly. Conversely, when the clearing wheel 6 pivots relatively deeply into the bin opening or openings 9 the rotational speed of the clearing wheel 6 decreases, as does the rate of travel of the car 2, once again under the influence of the position switches 51. Accordingly, the relationship between the rotational speed of the clearing wheel and the rate of travel of the car 2 exists to insure that the bulk material is not compressed on the clearing wheel 6 as a result of an excessive rate of travel along the bin openings 9. The respective position switches 51 adjust predetermined rotational speeds for the clearing wheel 6 at a predetermined rate of travel of the car 2.

The adjustment of the speed of rotation of the clearing wheel, its depth of penetration, and the rate of travel of the car 2 are electrically interconnected in such a way that when the pivotal arm 3 is pivoted relatively deeply into the bulk material the rotational speed of the clearing wheel 6 decreases and the bin-emptying car 2 travels more slowly past the bin openings 9. The same operation takes place conversely when the clearing wheel is pivoted out of the bin openings 9, and this relationship is essential if the machine 1 as a whole is to operate fully automatically.

Reference is now made to FIG. 5 of the drawing which illustrates control means in the form of hydraulic and electric circuits for automatically controlling all aspects of machine operation.

As is heretofore noted, the electric motor 12 (FIG. 5) drives the hydraulic pump 11 which takes hydraulic fluid from the reservoir 17 through the conduit 18 and supplies the same to the hydraulic motor 14 through the conduit 13. A return conduit or pipe (unnumbered) leads from the hydraulic motor 14 back to the reservoir 17. The output of the hydraulic pump 11 is adjustable through a servomotor 70. The hydraulic motor 14 drives or rotates the clearing wheel 6 through the gear transmission 15 and the associated gears 16a through 16b (FIGS. 1 and 2).

A plurality of pressure switch means or switches 54, 55 and 56 which respond to different pressures are connected in the line or conduit 13 of the hydraulic circuit. The pressure switch 54 operates when the hydraulic pressure in the line 13 is above a maximum predetermined level. The purpose of the pressure switch 54 is to prevent the machine 1 from operating if the pressure within the line 13 is too high.

The pressure switch 55 operates when the hydraulic pressure line 13 falls below a predetermined value and the pressure switch 56 operates when the pressure exceeds a certain value after the machine has started and during its clearing operation.

The electrical output of the pressure switch 54 is connected by a line 72 to one inverting input of an AND-gate 73 with the other input of the latter being connected by a line (unnumbered) to the level detector 71 in the reservoir 17. Another input 74 of the gate 73 is connected to a manual starting switch and a signal is present on the input 74 so long as it is intended to place the machne 1 in operation. However, if the pressure in the line is too high, as detected by the pressure switch 54, the machine will not start.

An output line 75 of the gate 73 is connected to the electric motor 12, and though illustrated as a direct connection this may be made through conventional switches or amplifiers. Thus the electric motor 12 is only activated through the line 75 when the level detector 71 is submerged in the hydraulic fluid and when the pressure in the line 13 does not exceed the value adjusted at the pressure switch 54. If the level detector 71 or the pressure switch 54 responds the gate 73 is closed and the electric motor 12 is switched off.

Another AND-gate 76 is provided for the drive means 38, 39, and includes a positive input connected by a line 77 to the line 75 while an inverting input 78 is connected by a line (unnumbered) to a level detector 79 in the reservoir 46. Another pressure switch 80 is also connected by a line (unnumbered) to the inverting input 78 of the gate 76. An output 81 of the gate 76 is connected to and controls the electric motor 38 which drives the hydraulic pump 39. The output of the hydraulic pump 39 is adjustable through a servomotor 82. The hydraulic pump 39 pumps hydraulic media through a line 83 to magnetic valve means 85, 86 for controlling the pivoting of the arm 3 and the drive of the car 2, respectively. The line 82 is connected to the reservoir 46 through a magnetic valve 84. If the magnetic valve 84 is switched through the pump 39 pumps the fluid in the absence of pressure through the closed circuit (unnumbered) of the pump 39 and the reservoir 46 without pivoting the arm 3 and imparting drive to the car 2. However, in the normal position (illustrated) the magnetic valve 84 is closed to pivot the arm 3 and drive the car 2, should condition so dictate.

The magnetic reversing valves 85, 86 are three-way valves which connect the pressure line 83 and a return line 87 to the associated drives 22, and 40, 41, respectively. In the middle position of the reversing valves 85, 86 the lines 83 and 87 are interrupted, in one end position they are connected directly, and in the other end position they are connected crosswise to the pressure lines which lead to the cylinder 22 and to the hydraulic motor 40.

When both magnets of the reversing valve 85 are not energized the valve 85 assumes its middle position (illustrated) in which the lines 83 and 87 are cut off. If the valve is moved to the left, as viewed in FIG. 5, the piston is pushed out of the cylinder 22 and the pivotal arm 3 is pivoted to the left. If by contrast the reversing valve 85 is moved to the right the piston is pushed into the cylinder 22 and the pivotal arm 3 is pivoted to the right.

Similarly, the hydraulic motor 40 is driven in one direction of rotation when the reversing valve 86 is pushed to the left and in the opposite direction when the reversing valve 86 is pushed to the right.

The range of pivotal motion of the arm 3 is divided up by four contacts denoted by the numerals 1 through 4 in each direction (right and left) of FIG. 5 with a zero or home contact situated in the middle position. The pivotal arm 3 closes that contact upon which it is located. All the contacts 51 are connected on one side to positive potential. The other ends of those contacts 51 situated on the right-hand side are connected to the contacts of a selector switch 90 while the other ends of the contacts 51 situated on the left-hand side are connected to the contacts of a selector switch 91. The selector switches 90, 91 are synchronized with one another in such a way that the contact which is switched on on the right-hand side is also switched on on the left-hand side. A line (unnumbered) leads from the right-hand selector switch 90 to an inverting input of an AND-gate 92 while a line (also unnumbered) leads from the left-hand selector switch 91 to an inverting input of an AND-gate 93.

The other inputs of the gates 92 and 93 are activated by travel limit switch means 94, 95, which are actuated by the car 2 at terminal points of its travel. In otherwords the switches 94 and 95 are situated at either end of the path of travel of the bin-emptying car 2 and are actuated by it when it reaches the end of its travel.

It is assumed that the pivotal arm 3 has been pivoted out to the right in the manner illustrated in FIG. 5 and is situated on contact 3 while the car 2 is travelling to the right toward the limit switch 95. The previously actuated limit switch 94 has a storage element (not shown) which retains the switching position until the opposite limit switch 95 has been actuated. When the car 2 comes into contact with the limit switch 95 a line 96 connected to the gate 92 deenergizes through the opening of the opposite limit switch 94 while a line 97 connected to the gate 93 is energized. As long as the gate 93 does not receive a signal from the selector switch 91 an output signal is present on a line 98 to energize the reversing valve 85 by drawing the same to the left. The pivot arm 3 is then pivoted to the left by the piston rod 24 until the switch 51 corresponding to the third step has been closed by the pivotal arm 3. If this is the case the AND-condition of the gate 93 inverting at one input is no longer fulfilled so that the line 98 is deenergized and the reversing valve 85 drops back into its shut-off position (illustrated).

The car drive is also reversed by actuating the limit switches 94, 95 through a control unit 99 forming a part of the overall electric circuit in conjunction with two OR-gates 100 and 101. The signal of the limit switch 94 is present at one input of the gate 100 while the signal of the limit switch 95 is present at the corresponding input of of the gate 101. The other inputs of the gates 100 and 101 are connected to the outputs of AND-gates 102 and 103, respectively. One input of the gate 102 is connected to the output of the gate 101 while one input of the gate 103 is connected to the output of the gate 100. The other input of the gate 102 is connected to the output of an OR-gate 104 while the other input of the gate 103 is connected to the output of an OR-gate 105. The gates 104 and 105 are each connected through one input to the output of a timing element 58 which has an adjustable running time of up to 100 seconds. The other inputs of the gates 104 and 105 together with the input of the timing element 58 are connected through a line 106 to the pressure switch 56 situated in the pressure line 13.

The minipressure switch 55 is connected through a line 116 to a timing element 59 at which a timing delay of up to 300 seconds can be adjusted. The output of the timing element 116 is connected to the inputs of the OR-gates 104 and 105.

The control circuit 99 for driving the car 2 operates as follows:

Under the effect of the limit switches 94, 95 that coil of the reversing valve 86 which corresponds to the particular direction of travel is energized through the gates 100 and 101. When one limit switch 94 is opened the other limit switch 95 is closed, and vice versa.

If the pressure in the line 13 has risen because the resistance of the bulk material to be cleared out has become too great the pressure switch 56 switches through and activates the timing element 58 through the line 106. At the same time the two OR-gates 104 and 105 also switch through. However, of the gates 102 and 103 it is only the gate at whose second input a signal is present which switches through. If the car 2 travel, for example, toward the switch 95 when the pressure switch 56 was released the AND-gate 103 is prepared because the OR-gate was switched through. In this case the high-pressure reversing command passes to the reversing valve 86 through the gates 103 and 101.

The direction of travel is reversed by the reversing valve 86 to the other direction when a high-pressure reversing command is present in the line 106. The control circuit 99 stores the particular direction of travel and changes the direction of travel when the pressure in the line 13 has become too high.

When the direction of travel is reversed in this way the timing element 58 on the expiration of the set time, produces another reversing signal which passes to the gates 104 and 105 and re-establishes the original direction of travel.

The result of this operation is that in the event of overloading of the clearing wheel drive the car drive is temporarily switched back so that the car travels back for a certain time in oder thereafter to continue its forward travel. During the temporary change in the direction of travel the pivot arm 3 is not, of course, pivoted over toward its opposite side.

When the pin-emptying car 2 is no longer clearing bulk material the hydraulic pressure falls below a predetermined adjusted minipressure and as a result the minipressure switch 55 applies voltage to the OR-gates 104 and 105 to reverse the direction of travel on expiration of running time of the timing element 59. The minipressure impulse again reverses the direction of travel on the expiration of running time of the timing element 58 to insure the bin-emptying car and more specifically the clearing wheel thereof is not completely removed from the bulk material. If the mini-pressure switch 55 responds twice within a time interval of, for example, 600 seconds, the bin-emptying car drive is switched off because it is resumed that the bin is empty.

By virtue of the fact that the pivoting movement of the pivoting arm 3 is coupled with the reversal of the car drive through the limit switches 94, 95 the clearing wheel 6 makes a rectangular movement. If the car travels toward the limit switch 95 the clearing wheel 6 is in its left-hand position, whereas when the direction of travel of the car 2 is reversed the clearing wheel is pivoted into the right-hand position.

Adjustment of the selector switches 90, 91 is manual by the actuation of a potentiometer 107 whose tap is coupled with the selector switches in the manner evident in FIG. 5. The potentiometer 107 is connected to a direct-current source and supplies the input value for a comparator 108. The other input value for the comparator is derived from the servomotor 70 of the hydraulic pump 11. To this end the servomotor 70 is coupled with a potentiometer 109 which is also connected to a direct current source. The output voltage of the comparator 108 controls the servomotor 70.

By this method of regulation, the servomotor 70 is always adjusted in such a way that the value at the potentiometer 109 always corresponds to the value at the potentiometer 107. If the pivotal arm 3 is pivoted outwards so that the clearing wheel 6 penetrates more deeply into the bulk material, the potentiometer 107 is adjusted in such a way that the servomotor 70 assumes a position in which it adjusts the hydraulic pump 11 to a lower rotational speed. It is possible additionally to provide between the potentiometer 107 and the comparator 108 a variable resistance 110 at which the ideal value may be adjusted between 0 and 100%.

In the follow-up regulating system described above, the servomotor 70 always adjusts the hydraulic pump 11 to a value which corresponds to the value adjusted at the selector switches 90, 91. The hydraulic pump 39 for the pivotal drive and for the car drive is also controlled in dependence upon that value. To this end, the tap of the potentiometer 109 is applied to the ideal value input of another comparator 112. The actual-value input of this comparator is connected to the top of a potentiometer 113 which is coupled to the servomotor 82 and connected to a current source. The output of the comparator 112 controls the servomotor 82. By virtue of this follow-up method, the voltage adjusted at the potentiometer 109 is always adjusted at the potentiometer 113, so that the hydraulic pump 39 is controlled in dependence upon the hydraulic pump 11 which in turn is influenced by the selector switches 90, 91.

If the pressure in the drive line 13 for the clearing wheel were suddenly to increase beyond the reversing pressure of the reversing switch 56, the clearing wheel 6 would block. In this case, the maximum pressure switch 54 responds, switching off the machine after a certain time governed by a timing element (not shown). When the clearing wheel is started up, the maximum pressure switch 54 in conjunction with the timing element enables the full starting torque of the three-phase drive motor to be utilized because, during the time set by the timing element, the excess pressure valve in the hydraulic pump is operative and, hence, the maximum pressure builds up on the clearing wheel in order to release it. If, at the end of the period set by the timing element, the clearing wheel has not been released, the drive of the bin-emptying car is switched off by means of the switch-off pressure switch 54 adjusted to a maximum pressure.

In order to be able to carry out clearing of the bulk material uniformly and under control in terms of quantity, the curvature of the clearing arms, according to another aspect of the invention, follows a logarithmic spiral. By virtue of their logarithmic spiral form, the clearing arms always enter the bulk material at the same angle without causing any agglomeration. Rather is the bulk material loosened up when it is discharged from the bin opening. This also provides for constant discharge, irrespective of the depth to which the clearing wheel penetrates into the bulk material.

While preferred forms and arrangement of parts have been shown in illustrating the invention, it is to be clearly understood that various changes in details and arrangement of parts may be made without departing from the scope and spirit of this disclosure.

We claim:

1. A machine for clearing bulk material comprising a movable support, first drive means for moving said support along a bin table upon which bulk material is supported, a clearing wheel carried by said support, second drive means for rotating said clearing wheel contiguous the bin table whereby bulk material is removed therefrom, control means automatically responsive to operational conditions of said second drive means for automatically controlling the operation of said first drive means, said control means additionally automatically controls the operation of said second drive means, said first and second drive means each include a hydraulic motor, a hydraulic circuit in part defined by said hydraulic motors, said control means is automatically responsive to operational conditions of pressure within said hydraulic circuit for automatically controlling said first drive means, means mounting said clearing wheel for pivotal movement upon said movable support in directions toward and away from said bin table, means for increasing and decreasing the operation of said second drive means hydraulic motor during respective pivoting of said clearing wheel away and toward said bin table to respectively increase and decrease the rotational speed of said clearing wheel, means for increasing and decreasing the operation of said first drive means hydraulic motor during respective increasing and decreasing operation of said second drive means hydraulic motor to thereby increase and decrease the speed of movement of said movable support respectively during increase and decrease of the rotational speed of said clearing wheel, said hydraulic circuit includes first and second reversing valve means, said first reversing valve means being disposed between said first drive means and said movable support for reversing the direction of movement thereof, and said second reversing valve means being disposed between said second drive means and said clearing wheel for increasing or decreasing the pivotal movement thereof.

2. The clearing machine as defined in claim 1 wherein said control means further includes electric circuit means for controlling said first and second drive means in conjunction with said hydraulic circuit, said electric circuit means includes switch means actuatable by pivotal movement of said clearing wheel and being connected to said first reversing valve means.

3. The clearing machine as defined in claim 2 wherein said electric circuit means includes first and second limit switch means for actuation upon said movable support reaching the end of either of its two opposite directions of travel, and said limit switch means being connected to said second reversing valve means.

4. The clearing wheel as defined in claim 3 wherein said electric circuit means further includes cooperative adjustable poteniometer means and selection switch means for controlling the output of said first drive means in dependence upon the output of said second drive means.

5. A machine for clearing bulk material comprising a movable support, first drive means for moving said support along a bin table upon which bulk material is supported, a clearing wheel carried by said support, second drive means for rotating said clearing wheel contiguous the bin table whereby bulk material is removed therefrom, control means automatically responsive to operational conditions of said second drive means for automatically controlling the operation of said first drive means and second drive means, said first and second drive means each include a hydraulic motor, a hydraulic circuit in part defined by said hydraulic motors, said control means is automatically responsive to operational conditions of pressure within said hydraulic circuit for automatically controlling said first drive means and said second drive means, said hydraulic circuit includes first means responsive to pressure in said hydraulic circuit beyond a predetermined value for preventing the operation of said second drive means hydraulic motor thereby precluding rotation of said clearing wheel, and said hydraulic circuit further includes second means responsive to pressure in said hydraulic circuit beyond a predetermined value for reversing the operation of said first drive means hydraulic motor thereby changing the direction of movement of said movable support.

6. A machine for clearing bulk material comprising a movable support, first drive means for moving said support along a bin table upon which bulk material is supported, a clearing wheel carried by said support, second drive means for rotating said clearing wheel contiguous the bin table whereby bulk material is removed therefrom, control means automatically responsive to operational conditions of said second drive means for automatically controlling the operation of said first drive means, said control means additionally automatically controls the operation of said second drive means, said first and second drive means each include a hydraulic motor, a hydraulic circuit in part defined by said hydraulic motors, said control means is automatically responsive to operational conditions of pressure within said hydraulic circuit for automatically controlling said first drive means, said hydraulic circuit includes first and second pressure responsive switch means, said first switch means being responsive to pressure in said hydraulic circuit beyond a predetermined value for preventing operation of said second drive means hydraulic motor thereby precluding rotation of said clearing wheel, and said second switch means being responsive to pressure in said hydraulic circuit beyond a predetermined value for reversing the operation of said first drive means hydraulic motor thereby changing the direction of movement of said movable support.

7. A machine for clearing bulk material comprising a movable support, first drive means for moving said support along a bin table upon which bulk material is supported, a clearing wheel carried by said support, second drive means for rotating said clearing wheel contiguous the bin table whereby bulk material is removed therefrom, control means automatically responsive to operational conditions of said second drive means for automatically controlling the operation of said first drive means, said control means additionally automatically controls the operation of said second drive means, said first and second drive means each include a hydraulic motor, a hydraulic circuit in part defined by said hydraulic motors, said control means is automatically responsive to operational conditions of pressure within said hydraulic circuit for automatically controlling said first drive means, said hydraulic circuit includes first, second and third pressure responsive switch means, said first switch means being responsive to pressure in said hydraulic circuit beyond a predetermined value for reversing the operation of said first drive means hydraulic motor thereby changing the direction of movement of said movable support, and said third switch means being responsive to pressure in said hydraulic circuit below a predetermined value for reversing the operation of said first drive means hydraulic motor thereby changing the direction of said movable support.

* * * * *